(12) United States Patent
Yabuzaki et al.

(10) Patent No.: US 8,310,795 B2
(45) Date of Patent: Nov. 13, 2012

(54) POWER FACTOR CORRECTION TYPE SWITCHING POWER SUPPLY UNIT

(75) Inventors: Jun Yabuzaki, Matsumoto (JP); Jian Chen, Matsumoto (JP)

(73) Assignee: Fuji Electric Co., Ltd. (JP)

( * ) Notice: Subject to any disclaimer, the term of this patent is extended or adjusted under 35 U.S.C. 154(b) by 78 days.

(21) Appl. No.: 12/943,420

(22) Filed: Nov. 10, 2010

(65) Prior Publication Data

US 2011/0141631 A1 Jun. 16, 2011

(30) Foreign Application Priority Data

Nov. 11, 2009 (JP) ................................. 2009-258001

(51) Int. Cl.
*H02H 9/02* (2006.01)
(52) U.S. Cl. ........................................................ 361/18
(58) Field of Classification Search .................. None
See application file for complete search history.

(56) References Cited

U.S. PATENT DOCUMENTS

| | | | |
|---|---|---|---|
| 2002/0089860 A1 | 7/2002 | Kashima et al. | |
| 2007/0253223 A1 | 11/2007 | Neidorff et al. | |
| 2011/0019322 A1* | 1/2011 | Akama | 361/93.1 |
| 2011/0109281 A1* | 5/2011 | Yabuzaki et al. | 323/210 |
| 2011/0122664 A1* | 5/2011 | Yabuzaki et al. | 363/53 |

FOREIGN PATENT DOCUMENTS

| | | | |
|---|---|---|---|
| JP | 7-007953 A | | 1/1995 |
| JP | 11-113251 A | | 4/1999 |
| JP | 11-252908 A | | 9/1999 |
| JP | 2002-176768 A | | 6/2002 |
| JP | 2002176768 | * | 6/2002 |
| JP | 2003-219635 A | | 7/2003 |
| JP | 2004-166440 A | | 6/2004 |
| JP | 2006-217695 A | | 8/2006 |

* cited by examiner

*Primary Examiner* — Rexford Barnie
*Assistant Examiner* — Angela Brooks
(74) *Attorney, Agent, or Firm* — Rossi, Kimms & McDowell LLP

(57) ABSTRACT

A power factor correction type switching power supply unit can change reference values of an overcurrent limit at an optimum timing at a time of an overcurrent protection of a step-up type converter, so that no sudden change occurs in an inductor current. A detection level selection circuit selects one of first and second threshold values with a selection signal, and outputs it as an overcurrent detection level to an overcurrent detection circuit. An input voltage monitoring circuit determines the selection signal in such a way that the larger of two threshold values is selected when an alternating current input voltage exceeds a first reference voltage, and the smaller threshold value is selected when the alternating current input voltage does not exceed a second reference voltage, and outputs the selection signal to the detection level selection circuit at a timing at which the alternating current input voltage approaches a zero.

9 Claims, 7 Drawing Sheets

POWER FACTOR CORRECTION TYPE SWITCHING POWER SUPPLY UNIT

BACKGROUND OF THE INVENTION

1. Technical Field

Aspects of the present invention relate to a power factor correction type switching power supply unit that supplies a direct current output voltage to a load based on a full-wave rectified alternating current input voltage, and in particular relate to a power factor correction type switching power supply unit that enables an overcurrent limit value to be changed to two differing magnitudes in accordance with the size of the alternating current input voltage.

2. Related Art

In recent years, a switching power supply unit that has an alternating current voltage as an input has been widely utilized in electronic instruments. This kind of switching power supply unit being one which, by causing a switching operation of a switching element linking an input and an output, converts a full-wave rectified alternating current input voltage into a direct current output voltage of a desired size, and supplies it to a load as, for example, the one described in JP-A-7-7953 (refer to paragraphs [0012] to [0018], FIG. 1, and the like of that reference), to be described hereafter, is known.

FIG. 6 is a circuit diagram showing one example of a heretofore known power factor correction type switching power supply unit. Herein, a power factor correction (PFC) type switching power supply circuit that operates in continuous conduction mode is shown, and this is applied to an active filter type power supply unit.

The heretofore known power factor correction type switching power supply unit shown in FIG. 6 has a full-wave rectifier 4 that full-wave rectifies a commercial power supply 2, and its output is connected to one end of an inductor L1. The connection point of the other end of the inductor L1 and a diode D1 is connected to the drain terminal of, for example, an N-channel type MOS transistor (a metal oxide semiconductor field-effect transistor) functioning as a switching element 6. The other end of the inductor L1 is connected to a load 8 via a rectifying and smoothing circuit formed of the diode D1 and a capacitor C1, and a direct current voltage Vout is output to the load 8.

As well as the source terminal of the MOS transistor, which is the switching element 6, being connected to the ground (GND), the gate terminal is connected to an output terminal DO of a power factor correction control circuit 10. One end of a series resistor circuit formed of resistors R1 and R2 is connected to the connection point of the full-wave rectifier 4 and inductor L1, and the other end is grounded. A multiplier input terminal VDET of the power factor correction control circuit 10 is a terminal into which a detected value of an alternating current output voltage is input from the full-wave rectifier 4, and the connection point of the resistors R1 and R2 is connected to the multiplier input terminal VDET. Also, the full-wave rectifier 4 is grounded via a resistor R3, and the connection point of the full-wave rectifier 4 and resistor R3 is connected to an inductor current signal input terminal IS of the power factor correction control circuit 10. Furthermore, a series circuit of resistors R4 and R5 is connected in parallel with the load 8, and a direct current output voltage Vout the same as that of the load 8 is applied thereto. A feedback voltage input terminal FB of the power factor correction control circuit 10 being a terminal into which a detected value of the direct current output voltage Vout is input, herein, the connection point of the resistors R4 and R5 is connected to the feedback voltage input terminal FB, and a voltage signal wherein the direct current output voltage Vout is voltage divided is returned here.

Next, a simple description will be given of an operation of the heretofore described heretofore known power factor correction type switching power supply unit of FIG. 6.

The heretofore known power factor correction type switching power supply unit of FIG. 6 employs a control method called an average current control method, average current mode control, or the like, and the power factor correction control circuit 10 is one that sinusoidally controls a current flowing to the alternating current commercial power supply 2 side in the same phase as that of the alternating current input voltage, while stabilizing the direct current output voltage Vout. The feedback voltage input terminal FB of the power factor correction control circuit 10 is connected to an input terminal of a voltage error amplifier 14, formed of a transconductance amplifier, together with a reference voltage source 12 which sets a voltage command value for the direct current output voltage Vout. The voltage error amplifier 14 generates a voltage error amplification signal wherein the difference between the detected value (a divided voltage value in this case) of the direct current output voltage Vout and the voltage command value (for example, 2.5V) of the reference voltage source 12 is amplified. A capacitor C2 and a series circuit of a resistor R6 and capacitor C3 are connected between the output terminal of the voltage error amplifier 14 and the GND. The voltage error amplification signal is supplied to a first input terminal of a multiplier 16.

A second input terminal of the multiplier 16 is connected to the multiplier input terminal VDET of the power factor correction control circuit 10, and the detected value (a divided voltage value in this case) of the alternating current output voltage of the full-wave rectifier 4 is input from here. The multiplier 16 multiplies the voltage error amplification signal supplied to the first input terminal and the detected value Vdet of the alternating current output voltage of the full-wave rectifier 4 supplied to the second input terminal, and makes this the value of a current command to a current error amplifier 18.

An inductor current signal, which is a voltage signal wherein an inductor current $I_L$ from the inductor current signal input terminal IS is voltage converted in the current detecting resistor R3, and an output signal Vmul of the multiplier 16, which is the current command value, are input into the current error amplifier 18. Also, an overcurrent protection (OCP) circuit 24 is connected to the inductor current signal input terminal IS. A sawtooth wave or triangular wave carrier signal of a constant frequency that determines a switching cycle is generated in an oscillator circuit (OSC) 20, and input into a PWM comparator 22. In the PWM comparator 22 into which the carrier signal and the current error amplification signal are input, the magnitudes of the signals are compared, a pulse width modulation (PWM) control signal is generated, and this is applied to the gate terminal of the switching element 6 via an AND circuit 26 and driver circuit 28.

Herein, the overcurrent protection circuit 24, based on the inductor current signal, limits the peak value of the inductor current $I_L$ in every switching cycle of the switching element 6. Herein, when an inductor current exceeding a predetermined threshold value flows, an L (Low) level overcurrent limit signal is input into the AND circuit 26, and the output of the AND circuit 26 compulsorily becomes L. A switching signal is output to the output terminal DO of the power factor correction control circuit 10 from the AND circuit 26 via the driver circuit 28. By controlling the on-off timing of the switching element 6 in this way, it is possible to control the value of a current flowing to the capacitor C1 via the diode D1. While a feedback constant setting circuit is connected between the input and output terminals of the current error amplifier 18, for clarity of description, a depiction of the feedback constant setting circuit is omitted from FIG. 6.

When this kind of power factor correction type switching power supply unit has the alternating current commercial power supply 2 as an input, it is supposed that the range of its alternating current input voltage is wide at 80 Vac to 265 Vac. Then, even with a switching power supply unit in which it is supposed that the alternating current input voltage changes, it is possible to realize a constant power control that places a limit on the direct current output power, but in actuality a circuit scale becomes large. For this reason, the constant power control is not normally applied to a switching power supply unit configured of a semiconductor integrated circuit with a small number of pins. That is, as the power factor correction control circuit 10 configured of a semiconductor integrated circuit with a small number of pins does not have a constant power control function, there is a problem in that, even when the overcurrent protection circuit operates at the same threshold value as the inductor current, the direct current output power changes greatly depending on the value of the alternating current input voltage.

FIG. 7 is a diagram showing a relationship between a direct current output power limited by an overcurrent protection operation and an alternating current input voltage. An alternating current input voltage (Vac) is shown on the horizontal axis, and a limited power (W) on the vertical axis.

That is, when the alternating current input voltage is high, the inductor current increases, and it becomes difficult to keep the direct current output power within an appropriate range, even when carrying out an overcurrent limitation. Therein, in a rectifying device including a function limiting the overcurrent of an AC input current, the rectifying device using a step-up converter type active filter, an overcurrent limiting circuit that detects whether the AC input voltage system is a 100V system or a 200V system and, in the case of the 200V system, switches the limit value of the overcurrent to one half of that of the 100V system, is disclosed in, for example, JP-A-7-7953 (refer to paragraphs [0012] to [0018], FIG. 1, and the like of that reference).

Also, in JP-A-2003-219635 (refer to paragraphs [0009] to [0023], FIGS. 3, 4, and the like of that reference) too, a technology is disclosed whereby a comparison reference voltage Vth for the inductor current is changed between a 100V system and a 200V system in order to avoid overcurrent limiter levels differing drastically between the 100V system and 200V system.

In neither of the technologies disclosed in the heretofore described JP-A-7-7953 and JP-A-2003-219635 is there any mention of a switch timing when switching between the two limit values or two comparison reference values. That is, there is no limit on the switch timing of the limit values or comparison reference values.

However, when providing the power factor correction switching power supply unit with an overcurrent limiting function having two threshold values, when the alternating current input voltage (the absolute value thereof) is high in order to realize a power factor correction, the input current also increases, meaning that the following kinds of problem occur.

That is, when setting overcurrent detection reference values and observing the alternating current input voltage on the premise that the alternating current input voltage is low, a case can be supposed wherein it is determined that the input voltage is high, and the reference value is switched. Therein, a switch is made from the higher reference value of the two threshold values to the lower reference value.

However, determining that the alternating current input voltage is high means that the detected input current is also increasing. Then, suddenly lowering the reference value of the overcurrent limit in that kind of situation is a movement compulsorily shutting off the current flowing in the inductor of the switching power supply unit. When the switching power supply unit is operating in a continuous current mode, as the inductor current is inevitably also at a high value at the point at which it is determined that the alternating current input voltage is high, there is a problem in that when attempting to shut off the current, an oscillation of the inductor current, and an accompanying squeaking, occur.

Also, when calculating the average value of the alternating current voltage using a low pass filter, or the like, and switching the overcurrent detection reference value in accordance therewith, it is not possible to predict the switch timing. Consequently, conditions of the inductor current oscillation and squeaking become complicated at a time of an overcurrent detection, and there is a problem in that there is a serious impediment to the stable operation of the power factor correction type switching power supply unit.

SUMMARY OF THE INVENTION

Aspects of the invention, having been contrived bearing in mind these kinds of problem, have an object of providing a power factor correction type switching power supply unit that, based on an alternating current input voltage full-wave rectified in a diode bridge, changes two reference values of an overcurrent limit at an optimum timing at a time of an overcurrent protection of a step-up type converter having an inductor, a switching element, and an output capacitor, so that no sudden change occurs in an inductor current.

According to one aspect of the invention, in order to solve the heretofore described problems, there is provided a power factor correction type switching power supply unit that enables an overcurrent limit value to be changed to at least two differing magnitudes in accordance with the size of a full-wave rectified alternating current input voltage to a step-up type converter having an inductor, a switching element, and an output capacitor.

The power factor correction type switching power supply unit includes a multiplier that multiplies a voltage error amplification signal, wherein the difference between a detected value of an output voltage and a reference voltage is amplified, and a detected value of the full-wave rectified alternating current input voltage, a control circuit that on-off controls the switching element based on an output of the multiplier and an inductor current signal detecting an inductor current flowing through the inductor, an overcurrent protection circuit that, by setting one of a first threshold value and second threshold value of mutually differing sizes, detects that the inductor current signal has exceeded the first threshold value or second threshold value, and generates an overcurrent detection signal limiting the inductor current, and an input voltage monitoring circuit that monitors the size of the detected value of the full-wave rectified alternating current input voltage, decides on a selection signal in such a way that the threshold value, of the first and second threshold values, whose absolute value is lower is selected and set when the detected value of the full-wave rectified alternating current input voltage exceeds a first reference voltage during a half-cycle of the alternating current input voltage, and the threshold value whose absolute value is higher is selected and set when a second reference voltage, which is a voltage equal to or lower than the first reference voltage, is not exceeded, inputs the selection signal into the overcurrent protection circuit, and carries out a change of the selection signal at a timing at which the alternating current input voltage reaches a zero level vicinity.

According to the power factor correction type switching power supply unit, it is possible to switch between threshold levels in an overcurrent protection circuit, and prevent the taking of too much output power, with a simple configuration. Also, it is possible to change the threshold level set in the overcurrent protection circuit in accordance with the size of the alternating current input voltage and, when the alternating current input voltage is high, reliably curb an excessive power at a time of an overcurrent protection operation. Then, by changing the threshold level at a timing at which the alternating current input voltage reaches the zero level vicinity, it is possible to prevent a sudden change in the inductor current, and an oscillation and squeaking of the inductor current caused by the sudden change.

DETAILED DESCRIPTION OF CERTAIN EMBODIMENTS

Figure 1:
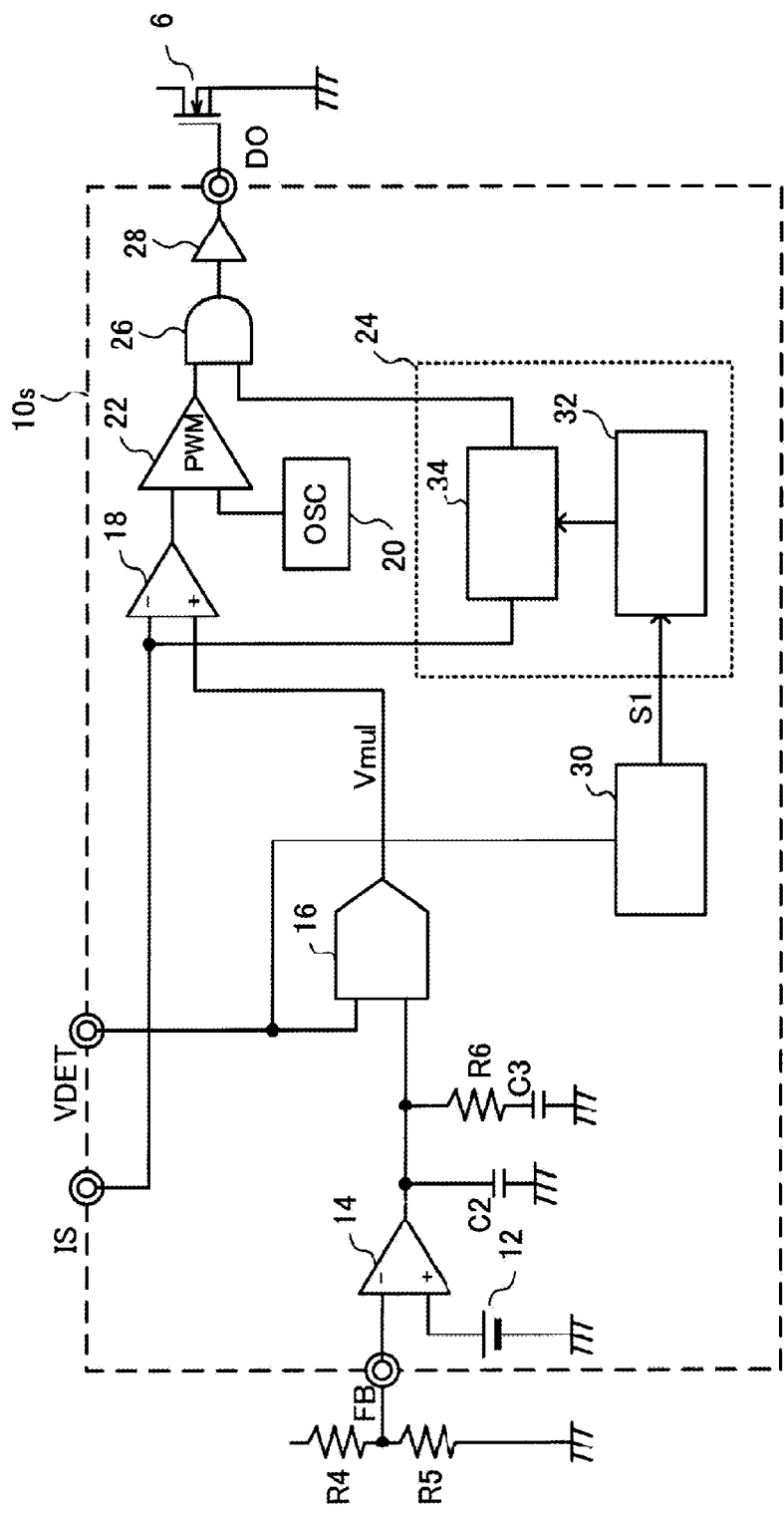
FIG. 1 is a circuit diagram showing a configuration of a power factor correction control circuit according to an embodiment of the invention.

Hereafter, a description will be given of an embodiment of the invention, with reference to the drawings. FIG. 1 is a circuit diagram showing a power factor correction control circuit according to the embodiment of the invention.

Figure 6:
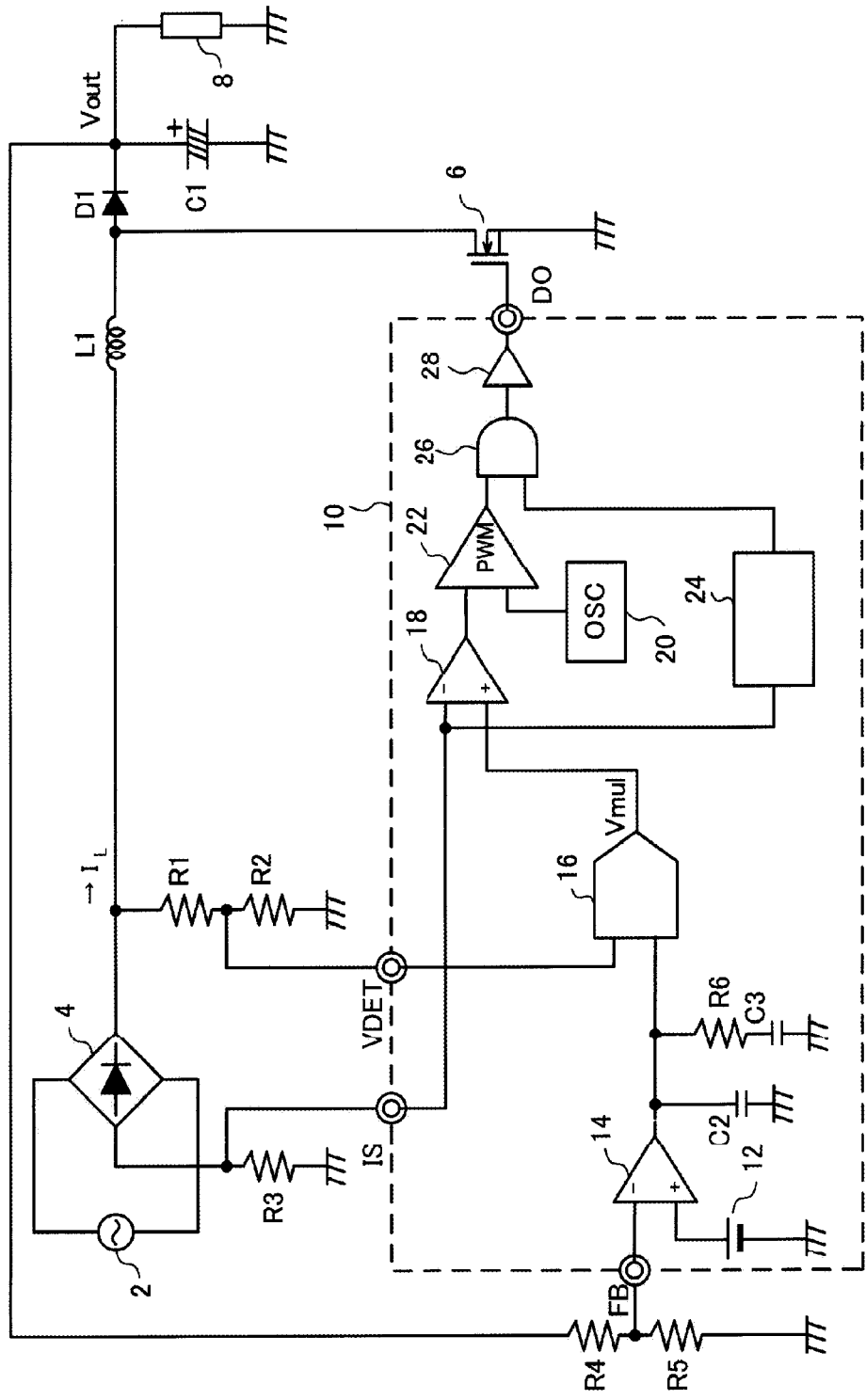
FIG. 6 is a circuit diagram showing one example of a heretofore known power factor correction type switching power supply unit.

A power factor correction type switching power supply unit that operates in continuous mode, which is the embodiment of the invention, has the same configuration as that of the heretofore known power factor correction type switching power supply unit shown in FIG. 6, which employs a control method called an average current control method, average current mode control, or the like, except that the power factor correction control circuit 10 is replaced with a power factor correction control circuit 10s.

The power factor correction control circuit 10s shown in FIG. 1, being one that sinusoidally controls a current flowing to an alternating current commercial power supply 2 side in the same phase as that of the alternating current input voltage, while stabilizing the direct current output voltage Vout, in the same way as the power factor correction control circuit 10, its feedback voltage input terminal FB is connected to an input terminal of a voltage error amplifier 14 together with a reference voltage source 12, which sets a voltage command value for a direct current output voltage Vout. The voltage error amplifier 14 generates a voltage error amplification signal (Ver) wherein the difference between the detected value of the direct current output voltage Vout, which is a return signal proportional to the direct current output voltage Vout, and the voltage command value of the reference voltage source 12 is amplified. A capacitor C2, and a series circuit of a resistor R6 and capacitor C3, are connected between the output terminal of the voltage error amplifier 14 and a GND. Then, the voltage error amplification signal of the voltage error amplifier 14 is input into a multiplier 16 together with a detected value Vdet of an alternating current input voltage proportional to an alternating current input voltage supplied from a multiplier input terminal VDET.

The output terminal of the multiplier 16 is connected to the non-inversion input terminal of a current error amplifier 18, and a current reference signal Vmul is input thereinto. In the current error amplifier 18, an inductor current signal, which is a voltage signal wherein an inductor current $I_L$ is detected by a current detecting resistor R3 (refer to FIG. 6), is input from an inductor current signal input terminal IS to the inversion input terminal, and a current error signal wherein the difference between the current reference signal Vmul and the inductor current signal is amplified is output. In an oscillator circuit (OSC) 20, a sawtooth wave or triangular wave of a constant frequency is generated as a carrier signal that determines a switching cycle, which is a cycle of an on-off operation of a switching element 6, and input into a PWM comparator 22. The PWM comparator 22, with the carrier signal and the current error signal from the current error amplifier 18 as inputs, generates a PWM control signal by comparing the magnitudes of the signals, and applies it to the gate terminal of the switching element 6 via an AND circuit 26 and driver circuit 28.

An input voltage monitoring circuit 30 connected to the multiplier input terminal VDET is provided in the power factor correction control circuit 10s. Also, a detection level selection circuit 32 and overcurrent detection circuit 34 are included in the power factor correction control circuit 10s as circuits corresponding to the overcurrent protection circuit 24 in the heretofore known unit, and a selection signal S1 is supplied from the input voltage monitoring circuit 30 to the detection level selection circuit 32 of the overcurrent protection circuit 24.

The detected value Vdet of the alternating current input voltage proportional to the alternating current input voltage (the absolute value thereof) is input from the multiplier input terminal VDET into the input voltage monitoring circuit 30 and, based on the detected value Vdet, the size of the alternating current input voltage supplied from the commercial power supply 2 to a step-up type converter is monitored. Also, first and second threshold values of mutually differing sizes are set in the detection level selection circuit 32. In the detection level selection circuit 32, one of the first and second threshold values is selected in accordance with the selection signal S1, which is a result of the monitoring in the input voltage monitoring circuit 30, and output as an overcurrent detection level to the overcurrent detection circuit 34.

In the input voltage monitoring circuit 30, it is possible to determine the selection signal S1 in such a way that the larger threshold value of the first and second threshold values is selected in the detection level selection circuit 32 when the alternating current input voltage exceeds a first reference voltage, and the smaller threshold value is selected when the alternating current input voltage does not exceed a second reference voltage, which is a voltage equal to or lower than the first reference voltage. As will be described hereafter, when the alternating current input voltage exceeds the second reference voltage, but does not exceed the first reference voltage, the value of the previous selection signal S1 is maintained. This is in order to give the alternating current input voltage hysteresis characteristics, but the first threshold value and second threshold value may also be made equal, and no hysteresis characteristics given. At this time, in the input voltage monitoring circuit 30, the selection signal S1 output to the detection level selection circuit 32 is switched at a timing at which the alternating current input voltage reaches the zero level vicinity. Because of this, in the detection level selection circuit 32, it is possible to carry out a change of the overcurrent detection level output to the overcurrent detection circuit 34 at the timing at which the alternating current input voltage reaches the zero level vicinity.

Consequently, at a time of an overcurrent protection of the step-up type converter, the detection level selection circuit 32 can change an overcurrent limit reference value output to the overcurrent detection circuit 34 at an optimum timing, so that no sudden change occurs in the inductor current.

Next, a description will be given of a specific configuration of the input voltage monitoring circuit 30 for outputting the selection signal S1 to the overcurrent protection circuit 24 in the heretofore described power factor correction control circuit 10s.

Figure 2:
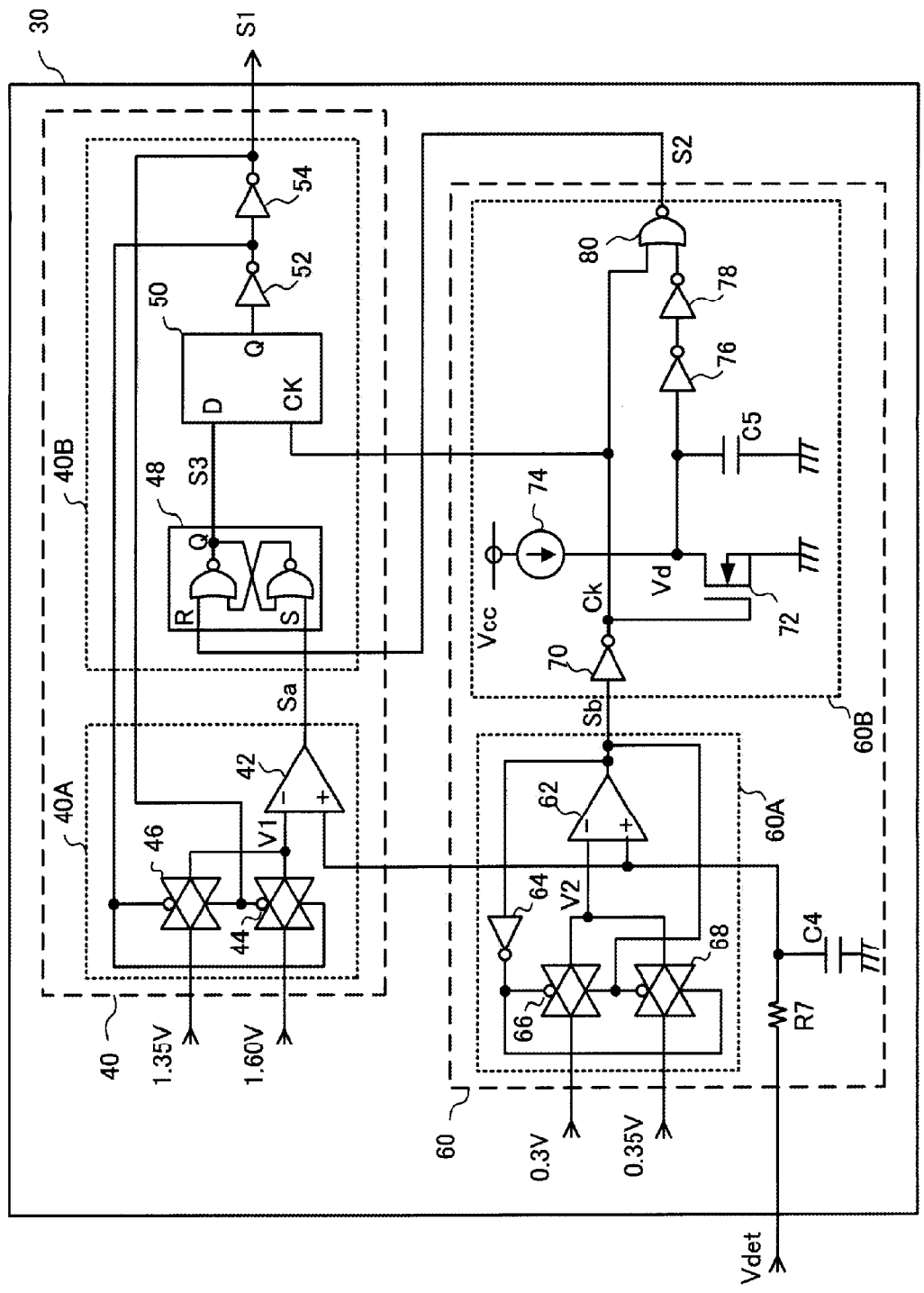
FIG. 2 is a circuit diagram showing one example of a specific configuration of an input voltage monitoring circuit of FIG. 1.

FIG. 2 is a circuit diagram showing one example of a specific configuration of the input voltage monitoring circuit of FIG. 1.

The input voltage monitoring circuit 30 is configured of a selection signal holding portion 40, and a timing detection portion 60 that prescribes a selection signal S1 switch timing to the selection signal holding portion 40. The selection signal holding portion 40 is configured of a comparator 42, transfer gates 44 and 46, an RS flip-flop 48, a D-type flip-flop 50, and inverters 52 and 54, and holds the selection signal S1 in accordance with an alternating current input voltage monitoring result.

Voltage signals of mutually differing magnitudes (1.60V and 1.35V) are input into the selection signal holding portion 40, and are supplied as the first reference voltage and second reference voltage to the inversion input terminal of the comparator 42 via the transfer gates 44 and 46 respectively. Also, the non-inversion input terminal of the comparator 42, as well as being grounded via a capacitor C4, is connected to the multiplier input terminal VDET via a resistor R7. The capacitor C4 and resistor R7 configure a filter circuit for removing high frequency noise caused by the switching operation of the switching element 6. In this way, the detected value Vdet of the alternating current input voltage proportional to the alternating current input voltage is supplied to the non-inversion input terminal of the comparator 42, and a monitoring circuit 40A that monitors the size of the alternating current input voltage is configured by the comparator 42 and transfer gates 44 and 46.

An output signal Sa of the comparator 42 is supplied as an alternating current input voltage monitoring result from the monitoring circuit 40A to one input terminal S of the RS flip-flop 48. The RS flip-flop 48 being such that, when an H (high) level signal is supplied to the input terminal S, the same H level is output to an output terminal Q, this condition does not change even in the event that the output signal Sa of the comparator 42 supplied to the input terminal S subsequently returns to an L (low) level, and the output terminal Q is maintained at the H level. Also, a one-shot signal S2 is supplied from the timing detection portion 60 to the other input terminal R of the RS flip-flop 48. When the other input terminal R attains the H level in a condition in which the output signal Sa of the comparator 42 input into the input terminal S is at the L level, the RS flip-flop 48 inverts an output signal S3 of the output terminal Q to the L level.

A holding circuit 40B that holds a selection signal in accordance with an alternating current input voltage monitoring result is configured in the selection signal holding portion 40 by the RS flip-flop 48, the D-type flip-flop 50, and the inverters 52 and 54. Herein, a configuration is such that the output terminal Q of the RS flip-flop 48 is connected to a D input terminal of the D-type flip-flop 50, and the output signal S3 of the RS flip-flop 48 is read from there into the D-type flip-flop 50 in synchronization with a clock signal Ck supplied to a CK terminal of the D-type flip-flop 50.

An output terminal Q of the D-type flip-flop 50 of the holding circuit 40B is connected to a first control terminal of the transfer gate 44 and a second control terminal of the transfer gate 46 via the inverter 52. The output terminal of the inverter 52 is further connected to a second control terminal of the transfer gate 44 and a first control terminal of the transfer gate 46 via the inverter 54. Herein, when the H level signal is input into the first control terminal, and the L level signal is input into the second control terminal, the transfer gates 44 and 46 attain a conduction state, and attain a condition in which the input signal can be forwarded to the output side. Also, the D-type flip-flop 50 is configured in such a way that its output terminal Q is connected to the detection level selection circuit 32 via the inverters 52 and 54, and the condition of the D-type flip-flop 50 is retrieved as the selection signal S1.

The monitoring circuit 40A configures a hysteresis comparator controlled by the output of the inverter 52 and inverter 54 fixed by the output of the D-type flip-flop 50 of the holding circuit 40B. Herein, when the output of the D-type flip-flop 50 is at the L level, the transfer gate 44 is conductive, and the first reference voltage (1.60V) is input into the inversion input terminal of the comparator 42. At this time, in the event that the detected value Vdet of the alternating current input voltage exceeds the first reference voltage, the output signal Sa of the comparator 42 attains the H level, and the RS flip-flop 48 is set. Then, the output signal S3 of the RS flip-flop 48 attains the H level, and this is read into the D-type flip-flop 50. Because of this, the output of the D-type flip-flop 50 attains the H level, and this time the transfer gate 46 is conductive, and the second reference voltage (1.35V) is input into the inversion input terminal of the comparator 42.

As will be described hereafter, immediately after the clock signal Ck is input and the D-type flip-flop 50 carries out the reading operation, the one-shot signal S2 is generated in the timing detection portion 60. The one-shot signal S2 is input into the RS flip-flop 48, and the RS flip-flop 48 is reset. Subsequently, even in the event that the detected value Vdet of the alternating current input voltage becomes lower than the first reference voltage, provided that the detected value Vdet exceeds the second reference voltage, the RS flip-flop 48 is set again, and its output signal S3 attains the H level, meaning that the H level condition is maintained in the D-type flip-flop 50.

Meanwhile, provided that the detected value Vdet of the alternating current input voltage does not exceed the second reference voltage (1.35V) between the RS flip-flop 48 being reset by the clock signal Ck and the next clock signal Ck being emitted, the output signal S3 of the RS flip-flop 48 remains at the L level. Because of this, the output signal S3 is read into the D-type flip-flop 50, as a result of which the transfer gate 44 is conductive again, and the first reference voltage is input into the inversion input terminal of the comparator 42. Subsequently, even in the event that the detected value Vdet of the alternating current input voltage becomes higher than the second reference voltage, provided that it does not exceed the first reference voltage (1.60V), the RS flip-flop 48 remains reset, meaning that the L level condition is maintained in the D-type flip-flop 50.

The timing detection portion 60 is configured of a comparison circuit 60A and a pulse generator circuit 60B, detects a timing at which the alternating current input voltage reaches the zero level vicinity, and instructs the selection signal holding portion 40 to output a selection signal. The comparison circuit 60A is configured of a comparator 62, an inverter 64, and transfer gates 66 and 68, wherein voltage signals of mutually differing magnitudes (0.30V and 0.35V) are input into the transfer gates 66 and 68, and are supplied as a third reference voltage and fourth reference voltage to the inversion input terminal of the comparator 62 via the transfer gates 66 and 68 respectively.

In the comparison circuit 60A, the detected value Vdet of the alternating current input voltage proportional to the alternating current input voltage (the absolute value thereof) is supplied to the non-inversion input terminal of the comparator 62, and an output signal Sb of the comparator 62 is output as an alternating current input voltage monitoring result to the pulse generator circuit 60B. The pulse generator circuit 60B, based on the output signal Sb of the comparison circuit 60A, starts up the clock signal Ck at a timing at which the detected value Vdet of the alternating current input voltage drops, reaching the third reference voltage (0.30V). At this time, the third reference voltage supplied to the comparison circuit 60A is set lower than the first and second reference voltages, the alternating current input voltage is monitored with the third reference voltage as a reference, and a timing at which the alternating current input voltage reaches the zero level vicinity is determined.

In the comparison circuit 60A, the output terminal of the comparator 62 is connected to a first control terminal of the transfer gate 66 and a second control terminal of the transfer gate 68. The output terminal of the comparator 62 is further connected to a second control terminal of the transfer gate 66 and a first control terminal of the transfer gate 68 via the inverter 64. By the fourth reference voltage being set lower than the first and second reference voltages, and higher than the third reference voltage, the comparator 62 is given hysteresis. That is, when the output signal Sb of the comparator 62 is at the H level, the transfer gate 66 is conductive, and the third reference voltage (0.30V) is input into the inversion input terminal of the comparator 62, and when the output signal Sb of the comparator 62 is at the L level, the transfer gate 68 is conductive, and the fourth reference voltage (0.35V) is input into the inversion input terminal of the comparator 62. By means of this configuration, when the detected value Vdet of the full-wave rectified alternating current input voltage drops to near the zero level vicinity, and becomes lower than the third reference voltage (0.30V), the output signal Sb of the comparator 62 inverts from the H level to the L level. Then, when the drop of the detected value Vdet of the full-wave rectified alternating current input voltage finishes and shifts to an increase, and its value exceeds the fourth reference voltage (0.35V), the output signal Sb of the comparator 62 inverts from the L level to the H level. That is, in the comparison circuit 60A, when the detected value Vdet of the full-wave rectified alternating current input voltage reaches the zero level vicinity, the output signal Sb with the L level short pulse is output from the comparator 62.

The pulse generator circuit 60B is configured of an inverter 70, an N-channel type MOSFET 72, a constant current source 74, a resistor R8, a capacitor C5, inverters 76 and 78, and a NOR gate 80. Herein, the output signal Sb of the comparison circuit 60A is inverted by the inverter 70, and the clock signal Ck is generated. The clock signal Ck is supplied to the gate terminal of the N-channel type MOSFET 72, one input terminal of the NOR gate 80, and the D-type flip-flop 50 of the selection signal holding portion 40.

The N-channel type MOSFET 72 and constant current source 74 are connected in series between the power source Vcc and a ground. The connection point of the drain terminal of the MOSFET 72 and the constant current source 74 is connected to the input terminal of the inverter 76. Also, the connection point of the drain terminal of the MOSFET 72 and the constant current source 74 is grounded via the capacitor C5. The constant current source 74 and capacitor C5 configure an integrated circuit, and perform the role of delaying and transmitting the decay of the clock signal Ck. That is, on the clock signal Ck decaying, the MOSFET 72 is turned off (shut off), and an integration of the constant current of the constant current source 74 by the capacitor C5 is started. Then, on the integral voltage of the capacitor C5 (the voltage between the two ends of the capacitor C5) reaching a threshold value voltage of the inverter 76, the output of the inverter 76 inverts from the H level to the L level, and it is not until this time that the decay of the clock signal Ck is transmitted to the inverter 78. Also, on the clock signal Ck rising, the MOSFET 72 is turned on (conductive), the capacitor C5 is immediately discharged, and the outputs of the inverters 76 and 78 attain the H level and L level respectively. The output signal of the inverter 78 is input into the other input terminal of the NOR gate 80.

In this way, in the NOR gate 80, a negative OR calculation of the clock signal Ck and a voltage Vd of the drain terminal of the MOSFET 72 is carried out, from which, as one input (the clock signal Ck) of the NOR gate 80 is at the H level when the clock signal Ck is at the H level, the output of the NOR gate 80 is always at the L level. Meanwhile, on the clock signal Ck decaying from the H level to the L level, as the integral voltage of the capacitor C5 has not reached the threshold value voltage of the inverter 76 immediately afterwards, the two inputs of the NOR gate 80 are both at the L level, meaning that the output of the NOR gate 80 is at the H level. Subsequently, as the output of the inverter 78 attains the H level on the integral voltage of the capacitor C5 reaching the threshold value voltage of the inverter 76, the output of the NOR gate 80 is at the L level. Consequently, the H level one-shot signal S2 having a duration determined by the constant current source 74, the capacitor C5, and the threshold value voltage of the inverter 76 is generated from the NOR gate 80, and output in synchronization with the decay of the clock signal Ck.

As heretofore described, as the L level short pulse signal Sb is output from the comparator 62 on the detected value Vdet of the full-wave rectified alternating current input voltage reaching the zero level vicinity, at this time, the clock signal Ck becomes an H level short pulse signal wherein the signal Sb is inverted. The D-type flip-flop 50 of the holding circuit 40B carries out the reading operation at the rise of the clock signal Ck, and the RS flip-flop 48 is reset by the one-shot signal S2 synchronized with the decay of the clock signal Ck. Then, the holding circuit 40B, on a half-cycle of the alternating current input voltage finishing, and the detected value Vdet of the alternating current input voltage reaching the zero level vicinity, firstly stores the condition of the RS flip-flop 48 in the D-type flip-flop 50, immediately after which it resets the RS flip-flop 48 in readiness for the input from the monitoring circuit 40A in the next half-cycle.

The detection level selection circuit 32 includes an unshown reference voltage circuit that individually generates a first threshold value and second threshold value of mutually differing sizes, and a selection circuit into which the first threshold value and second threshold value are input, and which outputs a signal selecting one of the two threshold values in accordance with the selection signal S1. Then, the signal selecting one of the two threshold values is output from the detection level selection circuit 32 as the overcurrent detection level. More specifically, when the selection signal S1 from the input voltage monitoring circuit 30 is at the H level, that is, when it is determined that the alternating current input voltage is high, the threshold value, of the first and second threshold values, whose absolute value is smaller is selected in the detection level selection circuit 32, and input as the overcurrent detection level into the overcurrent detection circuit 34. Also, when the selection signal S1 from the input voltage monitoring circuit 30 is at the L level, that is, when it is determined that the alternating current input voltage is low, the threshold value, of the first and second threshold values, whose absolute value is higher is selected in the detection level selection circuit 32, and input as the overcurrent detection level into the overcurrent detection circuit 34.

The first or second threshold value is input into the overcurrent detection circuit 34 from the detection level selection circuit 32, and the threshold value and the inductor current signal from the inductor current signal input terminal IS are compared. Then, in the event that it is determined that the inductor current signal exceeds the input threshold value, and that the absolute value of the inductor current signal is equal to or higher than the absolute value of the threshold value, an L level signal indicating that it is an overcurrent is input into the AND circuit 26, and the switching element 6 is turned off.

Next, a description will be given of a process whereby the input voltage monitoring circuit 30 receives the detected value Vdet of the alternating current input voltage proportional to the alternating current input voltage, and generates the selection signal S1 to be output to the detection level selection circuit 32 of the overcurrent protection circuit 24.

FIGS. 3A to 3J are operational timing diagrams showing one example of a signal waveform of each portion of the input voltage monitoring circuit, wherein the horizontal axis is time (t).

Figure 3:
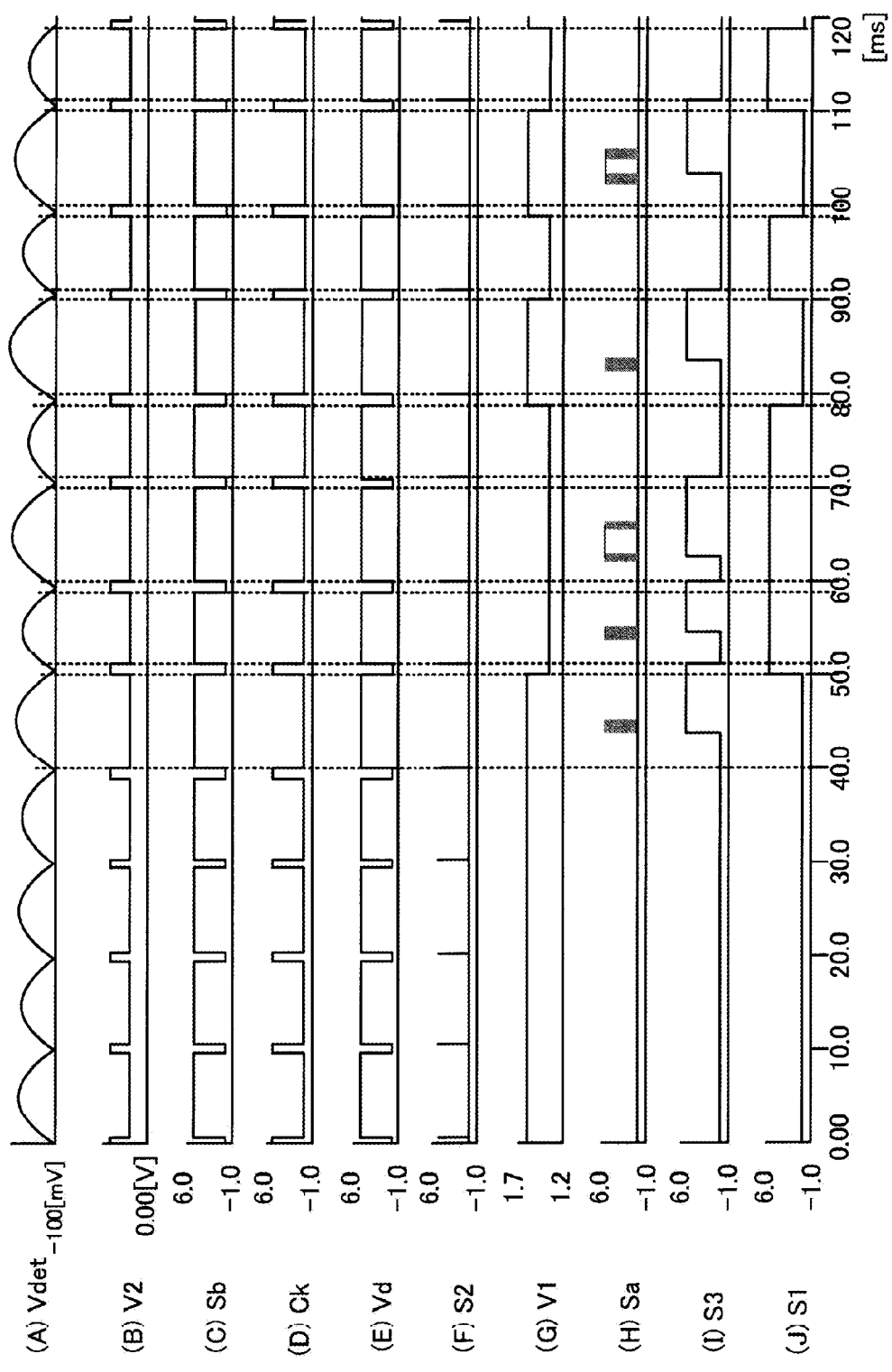
FIGS. 3A to 3J are operational timing diagrams showing one example of a signal waveform of each portion of the input voltage monitoring circuit.

As shown in FIG. 3A, the detected value Vdet of the alternating current input voltage is an alternating current waveform that fluctuates from −100 mV to a peak voltage of around 1.7V in a cycle of approximately 10 ms. −100 mV is an amount of voltage drop due to the resistor R3 shown in FIG. 6.

FIG. 3B shows the third reference voltage V2 supplied as the reference voltage to the comparator 62 of the comparison circuit 60A. FIG. 3C is the signal Sb supplied from the comparison circuit 60A to the pulse generator circuit 60B, and FIG. 3D is the clock signal Ck output from the inverter 70 as an inversion signal of the signal Sb. As the MOSFET 72 is turned on and off by the clock signal Ck, the voltage Vd of its drain terminal is a waveform which is an approximate inversion of the clock signal Ck, as shown in FIG. 3E, but a delay occurs in the timing of the rise due to the constant current source 74 and capacitor C5. However, in FIGS. 3A to 3J, the delay is shown as a very short time.

FIG. 3F shows the signal waveform of the one-shot signal S2 output from the NOR gate 80. FIG. 3G is the reference voltage V1 supplied to the comparator 42 of the monitoring circuit 40A. Also, FIG. 3H is the output signal Sa of the comparator 42, FIG. 3I is the output signal S3 of the output terminal Q of the RS flip-flop 48, and FIG. 3J is the selection signal S1.

With the detected value Vdet of FIG. 3A, the alternating current input voltage in a period of time t=40 ms to 50 ms shown on the horizontal axis increases more than the previous alternating current input voltage, indicating that the detected value Vdet of the alternating current input voltage has exceeded the first reference voltage (1.60V). For this reason, the output signal Sa of the comparator 42 shown in FIG. 3H temporarily changes to the H level. Because of this, as shown in FIG. 3I, the output signal S3 of the RS flip-flop 48 inverts to the H level when the signal Sa changes to the H level, and does not return to the L level until the one-shot signal S2 is supplied to its input terminal R.

At this time, the selection signal S1 shown in FIG. 3J is first inverted to the H level at the timing (t=50 ms) at which the clock signal Ck is supplied from the inverter 70 to the D-type flip-flop 50. Then, for the next two cycles too, as the detected value Vdet of the alternating current input voltage of FIG. 3A exceeds the second reference voltage (1.35V) supplied to the comparator 42, the selection signal S1 continues a condition in which the H level is held by the D-type flip-flop 50 of the holding circuit 40B. Subsequently, as the alternating current input voltage in a period of time t=70 ms to 80 ms drops more than the previous alternating current input voltage, and its detected value Vdet becomes lower than the second reference voltage (1.35V), at the finishing time of the period, the selection signal S1 changes to the L level at the timing (t=80 ms) at which the alternating current input voltage reaches the zero level vicinity.

Figure 4:
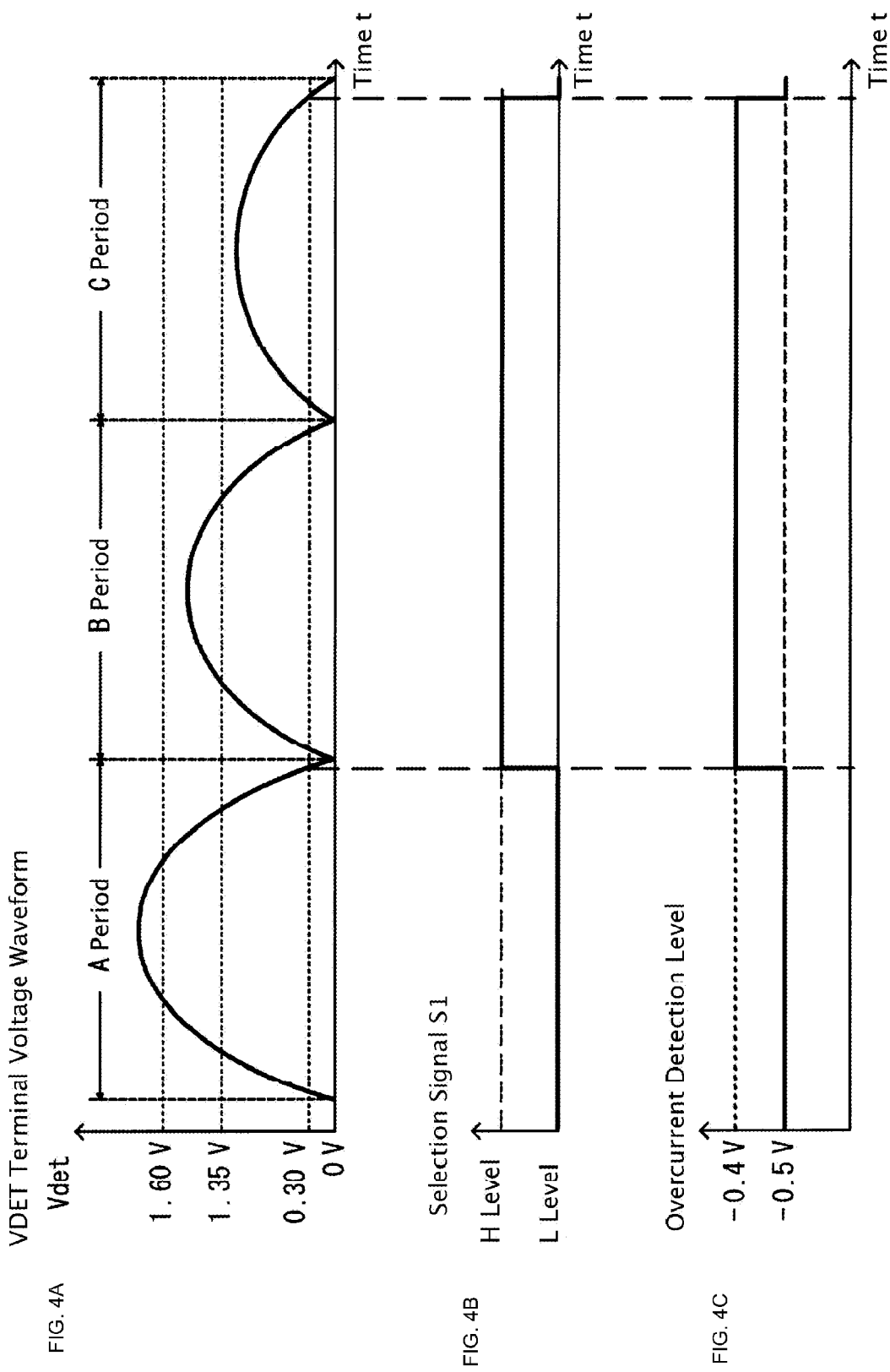
FIGS. 4A to 4C are diagrams showing a change of an alternating current input voltage and a relationship between a selection signal for selecting an overcurrent detection level (an overcurrent protection threshold value level) and the overcurrent detection level.

FIGS. 4A to 4C are diagrams showing the change of the alternating current input voltage and a relationship between the selection signal for selecting the overcurrent detection level (the overcurrent protection threshold value level) and the overcurrent detection level.

FIG. 4A corresponds to the detected value Vdet proportional to the alternating current input voltage (the absolute value thereof) shown in FIG. 3A, and peak voltage values differ in each of an A period, a B period, and a C period. Also, the selection signal S1 of FIG. 4B is the same as the selection signal S1 shown in FIG. 3J. The overcurrent detection level of FIG. 4C is a signal input from the detection level selection circuit 32 into the overcurrent detection circuit 34 in accordance with the selection signal S1 shown in FIG. 4B, and its level is either the first threshold value (−0.5V) or second threshold value (−0.4V). That is, when the selection signal S1 is at the L level, the first threshold value (−0.5V) with the higher absolute value becomes the overcurrent detection level, and when the selection signal S1 is at the H level, the second threshold value (−0.4V) with the lower absolute value becomes the overcurrent detection level. Herein, the reason the first threshold value and second threshold value are negative voltages is that the inductor current signal from the inductor current signal input terminal IS is input as a negative voltage signal whose absolute value increases in proportion to the size of the inductor current.

In the A period, the peak voltage value of the detected value Vdet of the alternating current input voltage exceeds the 1.6V set as the first reference voltage. In this kind of case, it is determined that the alternating current input voltage is high, and the selection signal S1 output to the detection level selection circuit 32 is changed from the L level to the H level at a timing at which the detected value Vdet of the alternating current input voltage drops to 0.3V or lower. The timing at which the selection signal S1 is inverted is set where the phase angle of the alternating current input voltage is low so that the inductor current does not change suddenly. Then, by the selection signal S1 attaining the H level, the overcurrent detection level is changed from the first threshold value (−0.5V) to the second threshold value (−0.4V) with the lower absolute value.

In the B period, the peak voltage value of the detected value Vdet becomes lower than the first reference voltage (1.6V), but exceeds the 1.35V set as the second reference voltage. For this reason, the selection signal S1 is maintained at the H level without inverting, and no switching of the overcurrent detection level is carried out in the detection level selection circuit 32.

On entering the C period, and the peak voltage value of the detected value Vdet becoming lower than the second reference voltage (1.35V), the selection signal S1 is changed from the H level to the L level at a timing at which the detected value Vdet reaches 0.3V. Then, by the selection signal S1 attaining the L level, the overcurrent detection level is changed from the second threshold value (−0.4V) to the first threshold value (−0.5V) with the higher absolute value.

Figure 5:
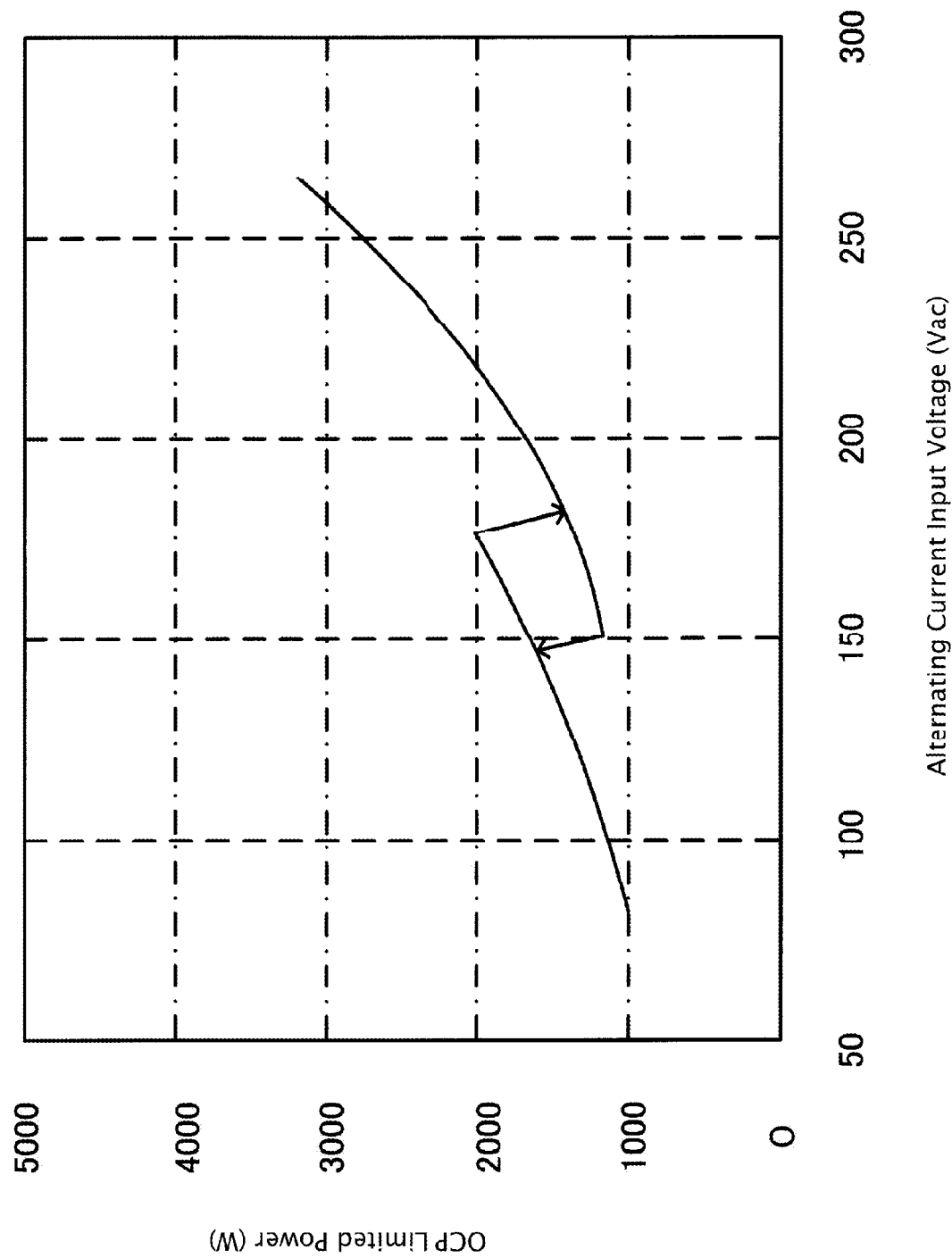
FIG. 5 is a diagram showing a relationship between a direct current output power limited by an overcurrent protection circuit of the invention and the alternating current input voltage.
Figure 7:
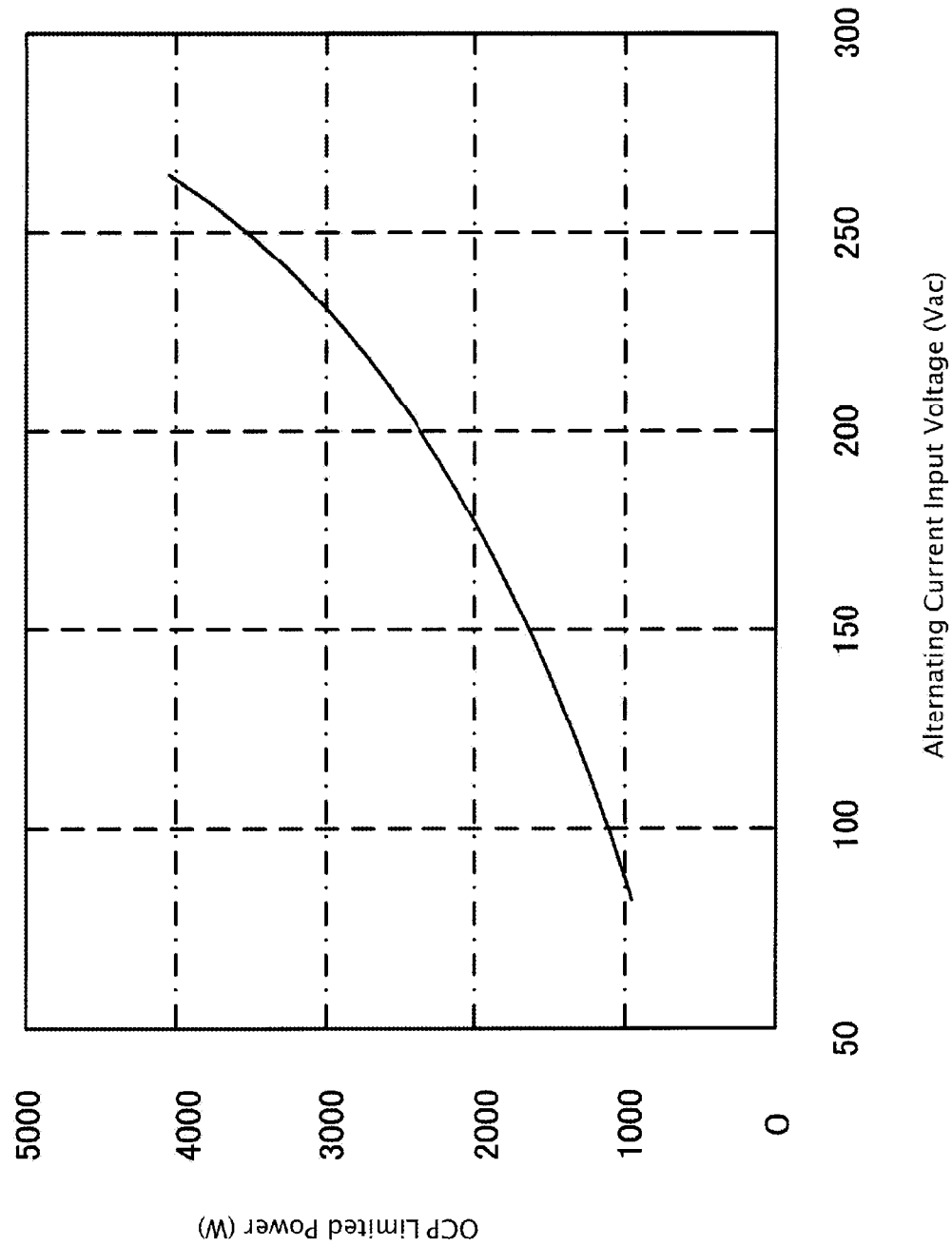
FIG. 7 is a diagram showing a relationship between a direct current output power limited by an overcurrent protection operation and an alternating current input voltage.

FIG. 5 is a diagram showing a relationship between the direct current output power limited by the overcurrent protection circuit of the invention and the alternating current input voltage. This corresponds to FIG. 7, which shows characteristics of the heretofore known unit, and shows the alternating current input voltage (Vac) on the horizontal axis, and a limited power (W) on the vertical axis.

In order to curb the peak current value of the inductor current, by lowering the overcurrent detection level (the absolute value thereof) when the alternating current input voltage becomes high by using the overcurrent detection circuit 34, which can switch between and employ two threshold values, it is possible to effectively curb the direct current output power when the overcurrent protection function operates. Also, by changing the overcurrent limit reference value at an optimum timing so that no sudden change of the inductor current occurs, a safe power supply design becomes possible.

In the heretofore described embodiment, the detected value Vdet proportional to the alternating current input voltage is input into the monitoring circuit 40A of the selection signal holding portion 40, and its peak value is monitored, but it is also possible to monitor an average voltage value of the alternating current input voltage in the monitoring circuit. In this case, it is sufficient that the detected value Vdet is input into an averaging circuit (for example, a series circuit formed of an amplifier and a low pass filter connected to its output), and the output of the averaging circuit is input into the comparator 42 shown in FIG. 2 instead of the detected value Vdet of the alternating current input voltage. In this case, the values of the first reference voltage and second reference are reviewed.

What is claimed is:

1. A power factor correction type switching power supply unit that enables an overcurrent limit value to be changed to at least two differing magnitudes in accordance with the size of a full-wave rectified alternating current input voltage to a step-up type converter having an inductor, a switching element, and an output capacitor, the unit comprising:
a multiplier that multiplies a voltage error amplification signal, wherein the difference between a detected value of an output voltage and a reference voltage is amplified, and a detected value of the full-wave rectified alternating current input voltage;
a control circuit that on-off controls the switching element based on an output of the multiplier and an inductor current signal detecting an inductor current flowing through the inductor;
an overcurrent protection circuit that, by setting one of a first threshold value and second threshold value of mutually differing sizes, detects that the inductor current signal has exceeded the first threshold value or second threshold value, and generates an overcurrent detection signal limiting the inductor current; and
an input voltage monitoring circuit that monitors the detected value of the full-wave rectified alternating current input voltage, selects one from first or second threshold in such a way that the threshold, whose absolute value is lower between first and second threshold, is selected and set when the detected value of the full-wave rectified alternating current input voltage exceeds a first reference voltage during a half-cycle of the alternating current input voltage, and the threshold, whose absolute value is higher between first and second threshold, is selected and set when a second reference voltage, which is a voltage equal to or lower than the first reference voltage, is not exceeded, inputs the selection signal into the overcurrent protection circuit, and carries out a change of the selection signal at a timing at which the alternating current input voltage reaches a zero level vicinity.

2. The power factor correction type switching power supply unit according to claim 1, wherein
the control circuit includes:
a current error amplifier that outputs a current error signal wherein the difference between the inductor current signal and the output of the multiplier is amplified; and
a PWM comparator that controls an on-off period of the switching element by pulse width modification using the current error signal.

3. The power factor correction type switching power supply unit according to claim 1, wherein
the overcurrent protection circuit includes:
a detection level selection circuit in which the first and second threshold values are set that selects one of them as an overcurrent detection level; and
an overcurrent detection circuit that detects the magnitude of the inductor current signal in accordance with the overcurrent detection level selected by the detection level selection circuit, and turns off the switching element.

4. The power factor correction type switching power supply unit according to claim 1, wherein
the input voltage monitoring circuit includes:
a selection signal holding portion that monitors the alternating current input voltage, and holds the selection signal in accordance with the result of the monitoring; and
a timing detection portion that detects the timing at which the alternating current input voltage reaches the zero level vicinity, and instructs the selection signal holding portion on an output timing of the selection signal.

5. The power factor correction type switching power supply unit according to claim 4, wherein
a peak value of the alternating current input voltage is monitored, and the selection signal decided on, in the selection signal holding portion.

6. The power factor correction type switching power supply unit according to claim 4, wherein an average value of the alternating current input voltage is monitored, and the selection signal decided on, in the selection signal holding portion.

7. The power factor correction type switching power supply unit according to claim 4, wherein
the timing detection portion includes:
a comparison circuit, in which a third reference voltage of a voltage lower than the second reference voltage is set, that determines the timing at which the alternating current input voltage reaches the zero level vicinity by comparing the third reference voltage and the detected value of the full-wave rectified alternating current input voltage; and
a pulse generator circuit that generates a one-shot signal from an output signal of the comparison circuit at a timing at which the detected value of the full-wave rectified alternating current input voltage drops in excess of the third reference voltage.

8. A power factor correction type switching power supply unit comprising:
a multiplier that multiplies a voltage error amplification signal, wherein the difference between a detected value of an output voltage and a reference voltage is amplified, and a detected value of a full-wave rectified alternating current input voltage;
a control circuit that on-off controls the switching element based on an output of the multiplier and an inductor current signal detecting an inductor current flowing through an inductor;
an overcurrent protection circuit that, by setting one of a first threshold value and second threshold value of mutually differing sizes, detects that the inductor current signal has exceeded the first threshold value or second threshold value, and generates an overcurrent detection signal limiting the inductor current; and
an input voltage monitoring circuit that monitors the detected value of the full-wave rectified alternating current input voltage, selects one from first or second threshold in such a way that the threshold, whose absolute value is lower between first and second threshold, is selected and set when the detected value of the full-wave rectified alternating current input voltage exceeds a first reference voltage during a half-cycle of the alternating current input voltage, and the threshold, whose absolute value is higher between first and second threshold, is selected and set when a second reference voltage, which is a voltage equal to or lower than the first reference voltage, is not exceeded, inputs the selection signal into the overcurrent protection circuit, and carries out a change of the selection signal at a timing at which the alternating current input voltage reaches a zero level vicinity.

9. A method, in a power factor correction type switching power supply unit, of changing an overcurrent limit value to at least two different magnitudes in accordance with the size of a full-wave rectified alternating current input voltage to a step-up type converter having an inductor, a switching element, and an output capacitor, the method comprising the steps of:
multiplying a voltage error amplification signal, wherein the difference between a detected value of an output voltage and a reference voltage is amplified, and a detected value of the full-wave rectified alternating current input voltage;
on-off controlling the switching element based on an output of the multiplier and an inductor current signal detecting an inductor current flowing through the inductor;
detecting, by setting one of a first threshold value and second threshold value of mutually differing sizes, that the inductor current signal has exceeded the first threshold value or second threshold value, and generating an overcurrent detection signal limiting the inductor current; and
monitoring the detected value of the full-wave rectified alternating current input voltage, selecting one from first or second threshold in such a way that the threshold, whose absolute value is lower between first and second threshold, is selected and set when the detected value of the full-wave rectified alternating current input voltage exceeds a first reference voltage during a half-cycle of the alternating current input voltage, and the threshold, whose absolute value is higher between first and second threshold, is selected and set when a second reference voltage, which is a voltage equal to or lower than the first reference voltage, is not exceeded, and changing the selection of the first or second thresholds at a timing at which the alternating current input voltage reaches a zero level vicinity.

* * * * *